United States Patent Office 2,913,006
Patented Nov. 17, 1959

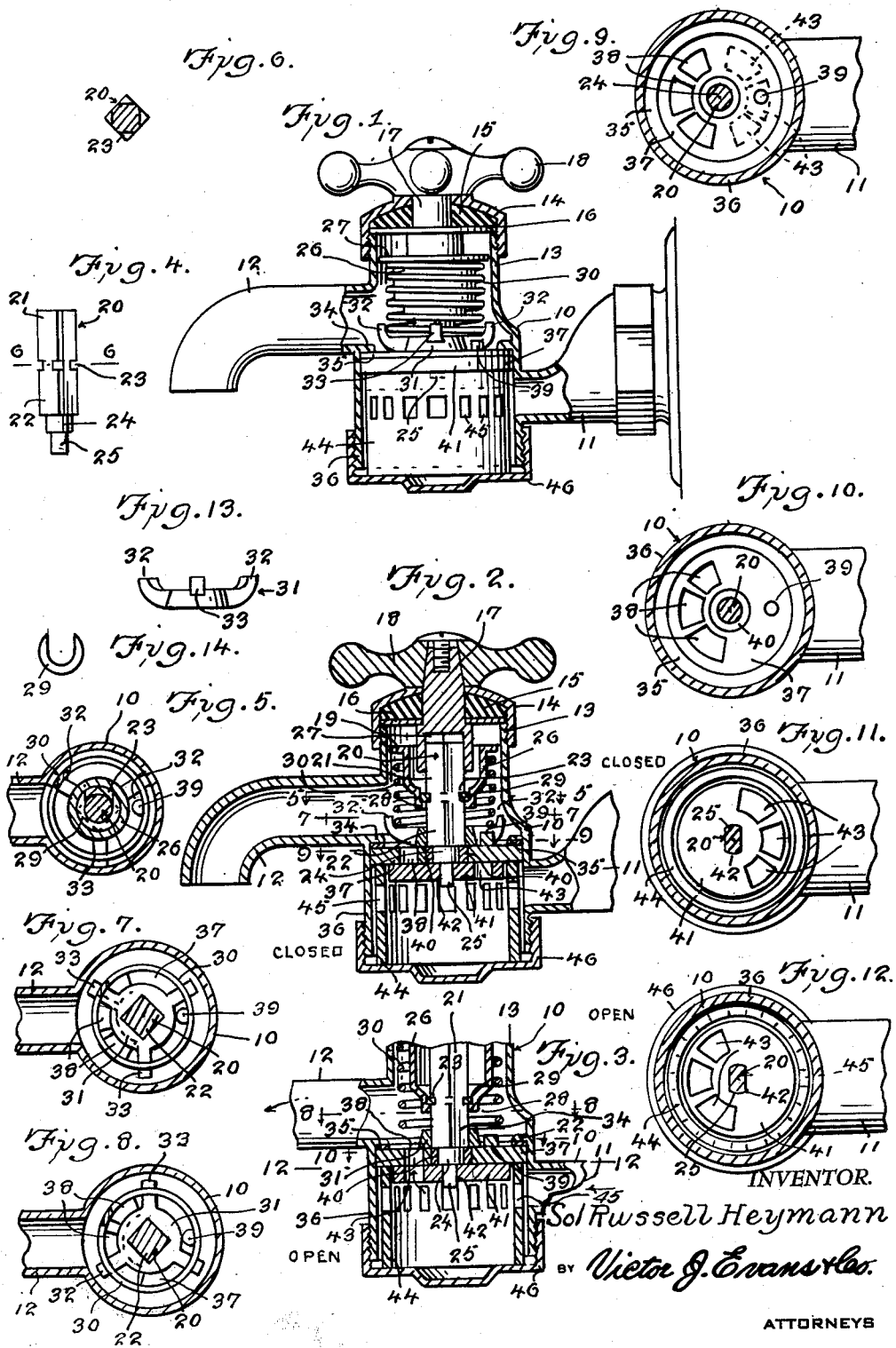

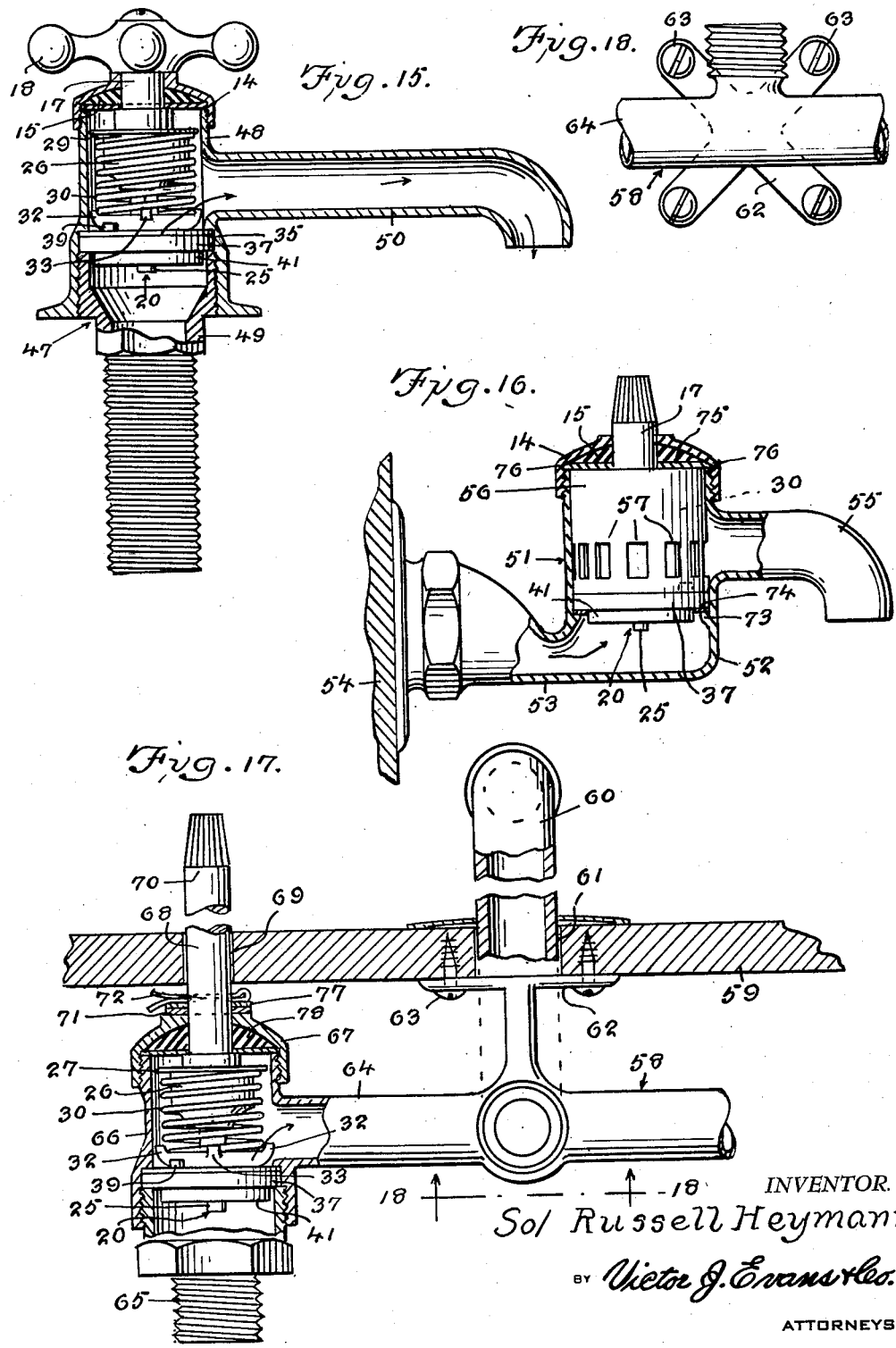

2,913,006

FAUCET OR VALVE

Sol Russell Heymann, Chattanooga, Tenn.

Application January 18, 1957, Serial No. 634,846

2 Claims. (Cl. 137—625.31)

This invention relates to a faucet or valve. The object of the invention is to provide a faucet or valve of the rotary type which is an improvement over previous faucets or valves in that the parts are constructed and arranged so that the faucet or valve will be less likely to get out of order.

Another object of the invention is to provide a faucet or valve of the rotary type which is adapted to be used for controlling the flow of fluid therethrough such as water whereby there will be less tendency for the parts of the valve or faucet to become worn or broken and wherein foreign particles or matter such as dust, rust and the like will not interfere or destroy the working action of the faucet or valve.

Another object of the invention is to provide a rotary faucet or valve which can be used with various types of fluid or liquids and wherein fluids having a high temperature will not interfere with the action of the faucet so that the useful life of the faucet or valve will be greatly extended.

A further object of the invention is to provide a faucet or valve which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view of the faucet, constructed according to the present invention, and with parts broken away and in section.

Figure 2 is a longitudinal sectional view taken through the faucet, and showing the faucet in closed position.

Figure 3 is a fragmentary sectional view similar to Figure 2, but showing the faucet in open position.

Figure 4 is a side elevational view of the stem.

Figure 5 is a sectional view taken on the line 5—5 of Figure 2.

Figure 6 is a sectional view taken on the line 6—6 of Figure 4.

Figure 7 is a sectional view taken on the line 7—7 of Figure 2.

Figure 8 is a sectional view taken on the line 8—8 of Figure 3.

Figure 9 is a sectional view taken on the line 9—9 of Figure 2.

Figure 10 is a sectional view taken on the line 10—10 of Figure 3.

Figure 11 is a view similar to Figure 10, but showing the parts in adjusted position.

Figure 12 is a sectional view taken on the line 12—12 of Figure 3.

Figure 13 is an elevational view of the support member.

Figure 14 is a plan view of the U-shaped clip.

Figure 15 is an elevational view of a modified faucet, with parts broken away and in section.

Figure 16 is an elevational view of another modified faucet, with parts broken away and in section.

Figure 17 is a plan view of a further modified faucet, with parts broken away and in section.

Figure 18 is a sectional view taken on the line 18—18 of Figure 17.

Referring in detail to the drawings, and more particularly to Figures 1 through 14 of the drawings, the numeral 10 indicates a valve casing or housing which can be made of any suitable material, and connected to the valve casing 10 is an inlet fitting or conduit 11 which is adapted to be connected to a suitable source of supply of fluid or liquid such as water. Extending outwardly from the valve casing 10 is an outlet fitting or conduit 12, and the casing 10 further includes an upper cylindrical portion 13. Connected to the upper cylindrical portion 13 of the valve casing 10, is a cap 14, and arranged below the cap 14 is a resilient packing member 15. A gasket or washer 16 is positioned below the packing member 15, and a rotary shaft 17 extends through the central portions of the cap 14, packing member 15, and washer 16. A manually operable handle or wheel 18 is connected to the upper end of the shaft 17, for rotating the shaft 17.

The lower end of the shaft 17 is provided with a rectangular recess or socket 19, Figure 2, and there is further provided a rotary valve stem which is indicated generally by the numeral 20, Figure 4. The valve stem 20 includes portions 21 and 22 of rectangular shape, and the upper end of the portion 21 is snugly seated in the recess 19 in the shaft 17. The valve stem 20 is further provided with an intermediate cutaway portion 23 for a purpose to be later described, and arranged on the lower portion of the valve stem 20 is a cylindrical section 24, there being a rectangular section 25 below the cylindrical section 24.

Positioned within the valve casing 10 is a collar 26 which includes an outwardly extending upper flange 27. The lower portion of the collar 26 is provided with a central opening 28 through which extends the stem 20. A U-shaped clip 29 engages the cutaway portion 23 of the valve stem 20, and the clip 29 is arranged just above the bottom of the collar 26. A coil spring 30 surrounds the collar 26, and the upper end of the coil spring 30 engages the flange 27.

Positioned below the spring 30 and arranged in engagement with the lower end thereof, is a support member 31, Figure 13. Extending upwardly from the outer edge of the support member 31 is a first pair of arms 32, and there is further provided an arm 33 which is arranged between the first arms 32. The bottom of the arm 33 is arranged above the bottoms of the arms 32 for a purpose to be later described.

Arranged within the valve casing 10 is a shoulder 34, and positioned just below the shoulder 34 is a gasket or washer 35. Arranged on the lower end of the valve casing 10 is a cylindrical section 36. Positioned below the gasket 35 and arranged within the cylindrical section 36 is a stationary plate 37, Figure 2. The plate 37 is provided with a plurality of spaced apart openings 38 for the passage therethrough of water or other fluids being handled. Extending upwardly from the plate 37 is a lug or pin 39, and the lug 39 is adapted to be selectively engaged by the pair of arms 32. However, since bottom of the arm 33 is in raised position, the arm 33 can pass over the lug 39, as the support member 31 is rotated. The plate 37 is provided with a central circular opening in which is seated a cylindrical bushing 40, and the bushing 40 surrounds the section 24 of the valve stem 20. Arranged just below the plate 37 is a rotary disc 41, and the disc 41 is provided with a central rectangular opening 42 which snugly receives the rectangular section 25 on the lower end of the stem 20. The rotary disc 41 is provided with a plurality of spaced apart openings 43, and the openings 43 are mounted for movement into and out of registry with the opening 38 in the plate 37, as the disc 41 is rotated.

Positioned within the cylindrical section 36 on the lower end of the valve casing 10, is a cylindrical sleeve 44, and the sleeve 44 is provided with a plurality of spaced apart slots 45. A cap 46 is mounted on the lower end of the valve casing, for retaining the sleeve 44 in its proper position.

Referring to Figure 15 of the drawings, there is shown a modified faucet which is indicated generally by the numeral 47, and the faucet 47 has substantially the same construction and operation as the previously described faucet shown in Figures 1 through 14. Thus, the faucet 47 includes a valve casing 48 which has an inlet fitting 49 and an outlet fitting or conduit 50 connected thereto. A cap 14 is connected to the upper end of the casing 48, and the shaft 17 projects through the cap 14. The disc 41 is adapted to be rotated upon manual rotation of the handle 18, and the disc 41 is arranged below and coacts with the stationary plate 37, there being the support member 32 positioned above the gasket 35. Thus, by properly rotating the handle 18, fluid such as water can be permitted to flow through the fitting 49, and out through the fitting 50, so that the control of fluid or water can be readily regulated or controlled as desired.

Referring to Figure 16 of the drawings, there is shown a further modified faucet which is generally indicated by the numeral 51, and the faucet 51 includes a valve casing 52, there being an inlet fitting 53 extending from a supporting structure 54 to the bottom of the casing 52. Extending outwardly from the casing 52 is an outlet fitting 55. Positioned in the upper portion of the casing 52 is a sleeve 56 which is provided with a plurality of slots or openings 57, and arranged below the sleeve 56 are the plate 47 and disc 41. The disc 41 can be rotated by a suitable manually operable means such as a handle arranged above the casing 52.

Referring to Figures 17 and 18 of the drawings, there is illustrated a still further modified faucet which is indicated generally by the numeral 58, and the faucet 58 is shown being used with or connected to a supporting structure which may be a wall 59. The supporting structure or wall 59 is provided with an opening 61 through which extends an outlet fitting 60, and for connecting the faucet assembly 58 to the supporting structure 59, a bracket 62 is provided, and the bracket 62 may be secured to the supporting structure 59 by means of suitable securing elements such as screws 63. Conduits 64 are connected to the outlet fitting 60, and the conduits 64 may be used for supplying hot and cold water or other liquid or fluid to the fitting 60. Thus, a valve casing 66 may be connected to the end of each of the pair of conduits 64, and each valve casing 66 may have an inlet fitting 65 connected thereto. A cap 67 is detachably connected to an end of each of the casings 66, and a shaft 68 extends through each cap 67 and through an opening 69 in the supporting structure 59. It is to be understood that there are two of the shafts 68, and the shafts 68 are provided with end portions 70 which are adapted to receive a handle, wheel or other means for operating the faucets or valves. Arranged contiguous to the outer surface of the cap 67 is a plurality of spacer members or washers 71, and extending transversely through the shaft 68 is a suitable securing element which may be a cotter key or pin 72. Otherwise the structure of the operating mechanism arranged in each casing 66 is the same, as previously described.

From the foregoing, it is apparent that there has been provided a faucet or valve assembly which can be used for controlling or regulating the flow of a fluid or liquid such as water. When using the faucet shown in Figures 1 through 14, the fitting 11 is adapted to be connected to a suitable source of supply of fluid such as hot or cold water. The faucet is shown in closed position in Figure 2 and in open position in Figure 3. With the faucet in the open position shown in Figure 3, the water or other liquid can flow through the fitting 11, and then through the slots 45 and into the interior of the sleeve 44. This fluid can then flow out through the openings 43 in the disc 41, and out through the registering openings 38 in the plate 37, and this fluid then flows out through fitting 12 to any desired receptacle or location. In Figure 2 the faucet is shown in closed position and it will be noted that the disc 41 is moved from the position shown in Figure 3 so that the openings 43 do not register with the openings 38 so that no water or other fluid can flow through the faucet. This movement of the disc 41 thus controls the passage of fluid through the faucet, and this movement of the disc 41 is accomplished by means of the handle 18. Thus, by rotating the handle 18, the shaft 17 will be rotated and this will cause rotation of the stem 20, since the rectangular upper portion 21 of the stem 20 is received in or seated in the square shaped socket 19 in the lower end of the shaft 17. As the stem 20 rotates, the support member 31 will also be rotated and similarly, the disc 41 will be rotated since the rectangular portion 25 on the lower end of the stem 20 is seated in the rectangular opening 42 in the disc 41. Thus, by manually rotating the wheel or handle 18, the disc 41 can be rotated so as to move the openings 43 into and out of registry or engagement with the openings 38 so that the flow of fluid through the faucet can be readily controlled.

By moving the handle 18 different distances, the openings 43 can be brought into full registry with the openings 38, or else the openings 43 can be brought into partial registry with the openings 38 whereby and desired quantity of fluid can be permitted to flow through the faucet. The lug or pin 39 serves to limit rotation of the support member 31, since the arms 32 will strike or engage the lug 39 as the support member 31 and valve stem 20 are rotated. However, the arm 33 has its lower surface positioned high enough so that it will not engage the lug 39 but will in fact pass over the lug 39 so that the arm 33 will not interfere with rotation of the support member 31 or its associated parts. The arms 32 and 33 serve as supports for the lower end of the coil spring 30. The collar 26 is retained in its proper position on the stem 20 by means of the U-shaped clip 29 shown in Figure 14. The upper portion of the coil spring 30 engages the flange 27 which extends outwardly from the top of the collar 26.

In Figure 15 there is shown a modified faucet 47 which operates on the same principle as the previously described faucet shown in Figures 1 through 14. However, in Figure 15 the fluid enters the valve casing 48 through the fitting 49 and this fluid leaves through the fitting 50. By rotating the handle 18, the disc 41 can be rotated so that the openings in the disc 41 can be moved into and out of registry with the openings in the plate 37 so as to permit control of the fluid which passes therethrough.

Referring to Figure 16 there is shown the modified faucet 51 wherein the fitting 53 which is the supply fitting or conduit, is adapted to be connected to a wall or supporting structure 54. The fluid such as water, enters the faucet 51 through the fitting 53 and then is adapted to pass up through the openings in the disc 41 and out through the openings in the plate 37, when the disc 41 is properly rotated. This fluid then passes up into the sleeve 56 and passes out through the slots 57 and out through the fitting 55.

In Figures 17 and 18 there is shown a further modified faucet 58 which may be of the double type so that for example several different fluids such as hot and cold water can be intermixed or permitted to flow out through the common outlet 60. The faucet 58 is adapted to be connected to a wall or supporting structure 59 by means of the previously described structure. Thus, by rotating either or both of the shafts 70, the discs 41 can be turned so as to permit the fluid to pass from the inlet fitting 65, through the valve casing 66 and through the conduit 64 and then through the outlet fitting 60. A suitable handle is adapted to be arranged on the portion 70 of the shaft 68.

Thus, it will be seen that there has been provided a faucet or valve of the rotary type wherein rubber or composition seat washers are eliminated and wherein valve stem and body threads are eliminated which have a tendency to wear out and strip so as to destroy the usefulness or effectiveness of the faucet. The valve or faucet is constructed so that the valve will be held in continuous contact with its seat whereby dirt, rust, or other particles or foreign matter will be prevented from coming between the valve and its seat so as to score the valve seat which might cause leaks. The faucet will give long periods of useful wear even when liquids of high temperature are being used which have a tendency to destroy ordinary faucet washers in a short period of time.

The valve casing can be made in different shapes or sizes depending upon the use for which the faucet or valve is to be used. For example the faucet shown in Figure 1 and in Figure 16 are ordinary single sink faucets, while the faucet shown in Figure 15 is a lavatory faucet.

The valve includes the stem 20 which has the square shaped portions that are provided with the slots or cutaway areas 23 so as to accommodate the clip 29. The stem 20 is further rounded as at 24 for accommodating the bushing 40, and there is further provided the rectangular portion 25 which forms an immovable connection with the disc 41.

The valve stem 20, bushing 40, and valve or disc 41 may be assembled and the disc 41 can be secured to the stem 20 in a permanent manner. Then, the valve stem is inserted through the central opening in the valve seat or plate 37 so that the bushing 40 fits snugly in the opening in the plate and whereby the plate 37 will be in contact with the disc 41. Then, the spring seat or support member 31 is slipped over the stem 20 and rides on top of the plate 37. The support member 31 is a small casting with the three arms 32 and 33 and there is further provided a square shaped opening in the center of the support member 31. The support member 31 performs two functions, namely, it serves as a support for the spring 30. Also, the arms 32 will contact the lug 39 so as to act as a limit stop when the valve is either wide open or closed. The arm 33 serves as a spring support only and rides over the lug 39. When the faucet is wide open, ports or openings 43 in the disc 41 register with the openings 38 in the plate 37. When the faucet is closed, the ports 43 are exactly opposite to the ports 38. Next, the spring 30 is placed over the valve stem 20 and seated so that it engages the support member 31. Then, the spring clip or collar 26 is slipped over the valve stem 20 until it engages the upper end of the spring 30. The collar is moved downwardly to compress the spring 30 and then the clip 29 is inserted in the slotted area 23 so as to complete the assembly and provide a compact unit which serves to hold the disc 41 in close contact with the valve seat or plate 37, and this assembly may be called a valve unit which can be installed in the valve body or valve casing in various manners.

For example in Figures 1, 2 and 3, the valve unit is inserted through the bottom, and the plate 37 and its gasket 35 rest against the seat or shoulder 34 which may be machined in the valve body or casing whereby a tight joint is provided. Then, the sleeve 44 which has the openings 45 therein, is placed against the bottom of the plate 37 and the cap 46 is screwed onto the lower end of the valve casing which forces the sleeve 44 against the plate 37 so as to insure that there will be a tight joint.

In Figure 15, instead of using the sleeve 44 and cap 46, the pipe casting or fitting 49 is screwed directly into the valve body 48 against the plate 37 so as to obtain the same results. Also, in Figure 16, instead of the valve unit being installed through the bottom of the body, it is inserted through the top. In Figure 16 the seat 73 is machined in the valve body 52 from the top, and a gasket 74 is placed on the seat 73 and the valve seat or plate 37 is placed on this gasket 74. The sleeve 56 then rests on top of the plate 37, and the washer 75 is forced down onto the sleeve 56 by means of the cap 14.

The shaft 17 may be made of a small casting which has a square shaped opening 19 in the bottom thereof which forms a slip joint over the valve stem 20 and the shaft 17 holds the hand wheel or handle 18 which operates the valve or faucet.

A single unit is formed when a washer such as the washer 16 is slipped over the shaft 17, and the resilient packing member 15 is placed on top of the washer 16 and then the cap 14 is placed over the packing 15, and then the hand wheel 18 is attached to the shaft 17. This unit, when screwed down on top of the valve body or valve casing serves to operate the valve stem 20 and also closes the top of the valve body. However, this unit, when used as shown in Figure 16, performs the additional function of forcing the sleeve 56 against the plate 37 so as to hold the valve unit in place in the valve body. The diameter of the washer 75 conforms to the diameter of the top of the sleeve 56, and the cap 14 shown in Figure 16 may be provided with a lip 76 which contacts the washer 75 so as to make a firm grip on the sleeve 56.

Thus, it will be seen that there has been provided a faucet wherein the valve unit is a compact assembly which can be assembled outside of the faucet body and then installed within the body. In the event that the valve unit becomes damaged or does not function properly, it can be replaced without disturbing the set-up. The only spring action that is required, is that of the light spring 30 which keeps the valve disc 41 in direct contact with the plate 37 when no pressure is on it. The faucet will not deteriorate under adverse conditions of use, as for example when hot water is passing therethrough and the assembly is especially useful in present day constructions wherein valves are usually or often hidden inside walls and behind fixtures which makes the job of servicing leaking washers extremely inconvenient.

In Figures 17 and 18 there is shown a double valve faucet which can be positioned between walls such as the walls 59. The inlet nipple 65 screws into the valve body 66 so as to hold the valve seat or plate 37 in place and the nipple 65 also serves as a connection to the supply pipe. The bracket 62 may be made as part of the body casting which can be attached to the inside of the wall 59. When the bonnet or cap 67 is assembled to be applied to the body casting, the shaft 68 is drawn up tight against the washer 77 and packing 78. Then, one or more spacer washers 71 are slipped over the shaft 68 so that when the key 72 is inserted through the opening in the shaft 68, the assembly will be compact without any loose play of the shaft 68. The shaft or stem 68 can be made of any desired length so that it will pass through the wall 59 whereby the operating hand wheel can be placed thereon.

I claim:

1. In a faucet, a valve casing, an inlet conduit connected to said casing and adapted to be connected to a source of supply of fluid, an outlet conduit connected to said casing and arranged in a plane which is spaced from the inlet conduit, said valve casing including an upstanding cylindrical portion, a cap connected to the upper end of said upstanding cylindrical portion, and a resilient packing member positioned within said cap, a washer arranged contiguous to the bottom of said packing member, a rotary shaft projecting through the central portion of said cap, packing member and washer, said shaft including a rectangular recess extending upwardly from the lower end thereof, a handle connected to the upper end of said shaft, a stem including a major portion which is square in cross section, the upper end of said stem being snugly seated in the recess in said shaft, there being a cutaway portion in said stem intermediate the ends thereof, a U-shaped clip arranged in engagement with said cutaway portion, a collar including a lower section abutting the bottom of said clip and said collar including an upper outwardly extending flange, a coil spring surrounding said collar and having its upper end abutting said flange, a rotary support member arranged in said valve casing and provided with a central rectangular opening for the projection therethrough of a portion of said stem, first, second and third spaced apart arms extending upwardly from the outer edge of said support member for engagement with the lower end of said coil spring, the bottom of said third arm being spaced above the bottom of said first and second arms, there being a shoulder in said valve casing, a cylindrical section arranged on the lower portion of said valve casing, a gasket abutting the bottom of said shoulder and positioned in said cylindrical section, a stationary plate arranged in said cylindrical section and abutting the bottom of said gasket, said plate being provided with a plurality of spaced apart openings therein, a lug extending upwardly from said plate for selective engagement by said first and second arms, there being a central circular opening in said plate, a cylindrical bushing seated in said last named opening, a cylindrical section on the lower portion of said stem projecting through said bushing, the rectangular section on the lower end of said stem arranged below the cylindrical section of said stem, a rotary disc arranged below said plate and provided with a central rectangular opening for snugly receiving the rectangular section on the lower end of said stem, said disc being of smaller diameter than said plate, there being a plurality of spaced apart openings in said disc mounted for movement into and out of registry with the openings in said plate, a cylindrical sleeve arranged in the cylindrical section on the lower end of said valve casing and said sleeve surrounding said disc, there being a plurality of spaced apart slots in said sleeve for the passage therethrough of fluid, and a cap connected to the lower end of the cylindrical section on the bottom of said valve casing.

2. In a faucet, a valve casing, an inlet fitting connected to the lower end of said valve casing, an outlet fitting connected to said valve casing, a cap connected to the upper end of said valve casing, a packing member arranged below said cap, a shaft extending through said cap and packing member, a handle connected to the upper end of said shaft, a collar arranged in said valve casing and surrounding the lower portion of said shaft, a support member spaced below said collar and including first, second and third arms extending upwardly from the outer edge portion thereof, a coil spring interposed between the arms of said support member and said collar, a stationary plate arranged below said support member, a lug extending upwardly from said plate for engagement with certain of said arms, and a rotary disc positioned below said plate and operatively connected to said shaft.

References Cited in the file of this patent

UNITED STATES PATENTS

| 86,268 | Baker | Jan. 26, 1869 |
| 782,648 | Gaensslen | Feb. 14, 1905 |
| 934,932 | Osbourn | Sept. 21, 1909 |
| 1,133,853 | Gold | Mar. 30, 1915 |
| 1,592,353 | Gade | July 13, 1926 |
| 1,933,839 | Bloch | Nov. 7, 1933 |
| 2,583,869 | Monson | Jan. 29, 1952 |

FOREIGN PATENTS

| 46,723 | Denmark | Jan. 2, 1933 |
| 159,405 | Germany | Aug. 26, 1940 |